US011255545B1

(12) United States Patent
Berry et al.

(10) Patent No.: US 11,255,545 B1
(45) Date of Patent: Feb. 22, 2022

(54) INTEGRATED COMBUSTION NOZZLE HAVING A UNIFIED HEAD END

(71) Applicant: General Electric Company, Schenectady, NY (US)

(72) Inventors: Jonathan Dwight Berry, Simpsonville, SC (US); Michael John Hughes, State College, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/079,847

(22) Filed: Oct. 26, 2020

(51) Int. Cl.
*F23R 3/28* (2006.01)
*F23R 3/34* (2006.01)
*F02C 7/22* (2006.01)

(52) U.S. Cl.
CPC .............. *F23R 3/283* (2013.01); *F23R 3/346* (2013.01); *F02C 7/222* (2013.01); *F23R 3/286* (2013.01); *F23R 3/34* (2013.01)

(58) Field of Classification Search
CPC ............. F23R 3/283; F23R 3/346; F23R 3/34
See application file for complete search history.

(56) References Cited

U.S. PATENT DOCUMENTS 2,595,999 A 5/1952 Way et al.
2,625,792 A 1/1953 McCarthy et al.
3,433,015 A 3/1969 Sneeden
3,584,972 A 6/1971 Bratkovich et al.
3,657,882 A 4/1972 Hugoson
3,657,883 A 4/1972 DeCorso
3,750,398 A 8/1973 Adeelizzi et al.
4,016,718 A 4/1977 Lauck
4,112,676 A 9/1978 DeCorso
4,158,949 A 6/1979 Reider
(Continued)

FOREIGN PATENT DOCUMENTS

EP 0805308 A1 11/1997
EP 0815995 A2 1/1998
(Continued)

OTHER PUBLICATIONS

Nishimura, et al., The Approach to the Development of the Next Generation Gas Turbine and History of Tohoku Electric Power Company Combined Cycle Power Plants, GT2011-45464, Proceedings of ASME Turbo Expo 2011, Vancouver, British Columbia, Canada, Jun. 6-10, 2011, pp. 1-6.

*Primary Examiner* — Todd E Manahan
*Assistant Examiner* — Alyson Joan Harrington
(74) *Attorney, Agent, or Firm* — Dority & Manning, P.A.

(57) ABSTRACT

Integrated combustion nozzles and turbomachines are provided. An integrated combustion nozzle includes a unified head end coupled to a combustion liner. The unified head end includes a first fuel nozzle and a second fuel nozzle disposed at a forward end portion of the combustion liner. A fuel plenum is defined between the first fuel nozzle and the second fuel nozzle. A first liner portion extends from the first fuel nozzle and into an opening of a first wall of the combustion liner such that the first liner portion forms a continuous surface with the first wall. The unified head end further includes a second liner portion that extends from the second fuel nozzle and into an opening of a second wall of the combustion liner such that the second liner portion forms a continuous surface with the second wall.

20 Claims, 8 Drawing Sheets

(56) References Cited

U.S. PATENT DOCUMENTS

| | | | | |
|---|---|---|---|---|
| 4,195,474 | A | 4/1980 | Bintz et al. | |
| 4,253,301 | A | 3/1981 | Vogt | |
| 4,297,843 | A | 11/1981 | Sato et al. | |
| 4,373,327 | A | 2/1983 | Adkins | |
| 4,413,470 | A | 11/1983 | Scheihing et al. | |
| 4,422,288 | A | 12/1983 | Steber | |
| 4,498,288 | A | 2/1985 | Vogt | |
| 4,566,268 | A | 1/1986 | Hoffeins et al. | |
| 4,614,082 | A | 9/1986 | Sterman et al. | |
| 4,719,748 | A | 1/1988 | Davis, Jr. et al. | |
| 4,720,970 | A | 1/1988 | Hudson et al. | |
| 4,802,823 | A | 2/1989 | Decko et al. | |
| 4,819,438 | A | 4/1989 | Schultz | |
| 4,843,825 | A | 7/1989 | Clark | |
| 4,903,477 | A | 2/1990 | Butt | |
| 5,075,966 | A | 12/1991 | Mantkowski | |
| 5,181,379 | A | 1/1993 | Wakeman et al. | |
| 5,207,064 | A * | 5/1993 | Ciokajlo | F23R 3/16 60/737 |
| 5,207,556 | A | 5/1993 | Frederick et al. | |
| 5,237,813 | A | 8/1993 | Harris et al. | |
| 5,239,818 | A | 8/1993 | Stickles et al. | |
| 5,274,991 | A | 1/1994 | Fitts | |
| 5,297,385 | A | 3/1994 | Dubell et al. | |
| 5,323,604 | A | 6/1994 | Ekstedt et al. | |
| 5,335,491 | A | 8/1994 | Barbier et al. | |
| 5,415,000 | A | 5/1995 | Mumford et al. | |
| 5,480,281 | A | 1/1996 | Correia | |
| 5,497,611 | A | 3/1996 | Benz et al. | |
| 5,511,375 | A | 4/1996 | Joshi et al. | |
| 5,628,192 | A | 5/1997 | Hayes-Bradley | |
| 5,640,851 | A | 6/1997 | Toon et al. | |
| 5,749,229 | A | 5/1998 | Abuaf et al. | |
| 5,761,898 | A | 6/1998 | Barnes et al. | |
| 5,822,853 | A | 10/1998 | Ritter et al. | |
| 5,826,430 | A | 10/1998 | Little | |
| 5,836,164 | A | 11/1998 | Tsukahara et al. | |
| 5,839,283 | A | 11/1998 | Dobbeling | |
| 5,906,093 | A | 5/1999 | Coslow et al. | |
| 5,924,288 | A | 7/1999 | Fortuna et al. | |
| 5,960,632 | A | 10/1999 | Abuaf et al. | |
| 6,018,950 | A | 2/2000 | Moeller | |
| 6,082,111 | A | 7/2000 | Stokes | |
| 6,085,514 | A | 7/2000 | Benim et al. | |
| 6,098,397 | A | 8/2000 | Glezer et al. | |
| 6,109,019 | A | 8/2000 | Sugishita | |
| 6,116,013 | A | 9/2000 | Moller | |
| 6,116,018 | A | 9/2000 | Tanimura et al. | |
| 6,276,142 | B1 | 8/2001 | Putz | |
| 6,298,656 | B1 | 10/2001 | Donovan et al. | |
| 6,298,667 | B1 | 10/2001 | Glynn et al. | |
| 6,339,923 | B1 | 1/2002 | Halila et al. | |
| 6,345,494 | B1 | 2/2002 | Coslow | |
| 6,357,237 | B1 | 3/2002 | Candy et al. | |
| 6,374,593 | B1 | 4/2002 | Ziegner | |
| 6,397,581 | B1 | 6/2002 | Vidal et al. | |
| 6,397,602 | B2 | 6/2002 | Vandervort et al. | |
| 6,412,268 | B1 | 7/2002 | Cromer et al. | |
| 6,450,762 | B1 | 9/2002 | Munshi | |
| 6,456,627 | B1 | 9/2002 | Frodigh et al. | |
| 6,463,742 | B2 | 10/2002 | Mandai et al. | |
| 6,523,352 | B1 | 2/2003 | Takahashi et al. | |
| 6,536,216 | B2 | 3/2003 | Halila et al. | |
| 6,546,627 | B1 | 4/2003 | Sekihara et al. | |
| 6,568,187 | B1 | 5/2003 | Jorgensen et al. | |
| 6,607,355 | B2 | 8/2003 | Cunha et al. | |
| 6,619,915 | B1 | 9/2003 | Jorgensen | |
| 6,644,032 | B1 | 11/2003 | Jorgensen et al. | |
| 6,699,015 | B2 | 3/2004 | Villhard | |
| 6,886,622 | B2 | 5/2005 | Villhard | |
| 6,889,495 | B2 | 5/2005 | Hayashi et al. | |
| 6,921,014 | B2 | 7/2005 | Hasz et al. | |
| 6,951,211 | B2 | 10/2005 | Bryant | |
| 7,010,921 | B2 | 3/2006 | Intile et al. | |
| 7,056,093 | B2 | 6/2006 | Self et al. | |
| 7,104,069 | B2 | 9/2006 | Martling et al. | |
| 7,197,877 | B2 | 4/2007 | Moraes | |
| 7,310,938 | B2 | 12/2007 | Marcum et al. | |
| 7,325,402 | B2 | 2/2008 | Parker et al. | |
| 7,334,960 | B2 | 2/2008 | Glessner et al. | |
| 7,437,876 | B2 | 10/2008 | Koshoffer | |
| 7,493,767 | B2 | 2/2009 | Bunker et al. | |
| RE40,658 | E | 3/2009 | Powis et al. | |
| 7,665,309 | B2 | 2/2010 | Parker et al. | |
| 7,690,203 | B2 | 4/2010 | Bland | |
| 7,707,833 | B1 | 5/2010 | Bland et al. | |
| 7,789,125 | B2 | 9/2010 | Mayer et al. | |
| 7,836,703 | B2 | 11/2010 | Lee et al. | |
| 7,874,138 | B2 | 1/2011 | Rubio et al. | |
| 7,886,517 | B2 | 2/2011 | Chopra et al. | |
| 7,926,278 | B2 | 4/2011 | Gerendas et al. | |
| 8,011,188 | B2 | 9/2011 | Woltmann et al. | |
| 8,015,818 | B2 | 9/2011 | Wilson et al. | |
| 8,104,292 | B2 | 1/2012 | Lee et al. | |
| 8,123,489 | B2 | 2/2012 | Udall et al. | |
| 8,141,334 | B2 | 3/2012 | Johnson et al. | |
| 8,151,570 | B2 | 4/2012 | Jennings et al. | |
| 8,272,218 | B2 | 9/2012 | Fox et al. | |
| 8,281,594 | B2 | 10/2012 | Wiebe | |
| 8,281,595 | B2 | 10/2012 | Davis, Jr. et al. | |
| 8,307,657 | B2 | 11/2012 | Chila | |
| 8,375,726 | B2 | 2/2013 | Wiebe et al. | |
| 8,381,532 | B2 | 2/2013 | Berry et al. | |
| 8,387,391 | B2 | 3/2013 | Patel et al. | |
| 8,387,398 | B2 | 3/2013 | Martin et al. | |
| 8,393,867 | B2 | 3/2013 | Chon et al. | |
| 8,464,537 | B2 | 6/2013 | Khan et al. | |
| 8,499,566 | B2 | 8/2013 | Lacy et al. | |
| 8,511,086 | B1 | 8/2013 | Uhm et al. | |
| 8,549,857 | B2 | 10/2013 | Papile | |
| 8,549,861 | B2 | 10/2013 | Huffman | |
| 8,572,980 | B2 | 11/2013 | Winkler et al. | |
| 8,590,313 | B2 | 11/2013 | Graves et al. | |
| 8,616,002 | B2 | 12/2013 | Kraemer et al. | |
| 8,647,053 | B2 | 2/2014 | Hsu et al. | |
| 8,667,682 | B2 | 3/2014 | Lee et al. | |
| 8,720,205 | B2 | 5/2014 | Lugg | |
| 8,752,386 | B2 | 6/2014 | Fox et al. | |
| 8,801,428 | B2 | 8/2014 | Melton et al. | |
| 8,851,402 | B2 | 10/2014 | Dinu et al. | |
| 9,015,944 | B2 | 4/2015 | Lacy et al. | |
| 9,016,066 | B2 | 4/2015 | Wiebe et al. | |
| 9,097,184 | B2 | 8/2015 | Stryapunin et al. | |
| 9,121,286 | B2 | 9/2015 | Dolansky et al. | |
| 9,188,335 | B2 | 11/2015 | Uhm et al. | |
| 9,255,490 | B2 | 2/2016 | Mizukami et al. | |
| 9,334,808 | B2 | 5/2016 | Abe et al. | |
| 9,335,050 | B2 | 5/2016 | Cunha et al. | |
| 9,360,217 | B2 | 6/2016 | DiCintio et al. | |
| 9,366,437 | B2 | 6/2016 | Melton et al. | |
| 9,370,846 | B2 | 6/2016 | Morimoto et al. | |
| 9,395,085 | B2 | 7/2016 | Budmir et al. | |
| 9,435,539 | B2 | 9/2016 | Keener et al. | |
| 9,458,767 | B2 | 10/2016 | Farrell | |
| 9,476,592 | B2 | 10/2016 | Berry | |
| 9,512,781 | B2 | 12/2016 | Mizukami et al. | |
| 9,518,478 | B2 | 12/2016 | Smith et al. | |
| 9,599,343 | B2 | 3/2017 | Abd El-Nabi et al. | |
| 9,650,958 | B2 | 5/2017 | DiCintio et al. | |
| 9,759,425 | B2 | 9/2017 | Westmoreland et al. | |
| 9,777,581 | B2 | 10/2017 | Nilsson | |
| 10,087,844 | B2 | 10/2018 | Hughes et al. | |
| 10,161,635 | B2 | 12/2018 | Pinnick et al. | |
| 10,247,103 | B2 | 4/2019 | Word et al. | |
| 10,267,521 | B2 | 4/2019 | Papple et al. | |
| 10,520,193 | B2 | 12/2019 | Berry | |
| 10,520,194 | B2 | 12/2019 | Berry et al. | |
| 10,563,869 | B2 | 2/2020 | Berry et al. | |
| 2002/0043067 | A1 | 4/2002 | Maeda et al. | |
| 2002/0112483 | A1 | 8/2002 | Kondo et al. | |
| 2003/0140633 | A1 | 7/2003 | Shimizu et al. | |
| 2003/0156942 | A1 | 8/2003 | Villhard | |
| 2003/0167776 | A1 | 9/2003 | Coppola | |
| 2003/0192320 | A1 | 10/2003 | Farmer et al. | |

(56) References Cited

U.S. PATENT DOCUMENTS

2003/0194320 A1 10/2003 Villhard
2004/0060295 A1 4/2004 Mandai et al.
2004/0123849 A1 7/2004 Bryant
2004/0154152 A1 8/2004 Howard et al.
2004/0177837 A1 9/2004 Bryant
2005/0000222 A1 1/2005 Inoue et al.
2005/0056313 A1 3/2005 Hagen et al.
2005/0077341 A1 4/2005 Larrieu et al.
2005/0223713 A1 10/2005 Ziminsky et al.
2006/0038326 A1 2/2006 Vecchiet et al.
2006/0053798 A1 3/2006 Hadder
2006/0070237 A1 4/2006 Johnson et al.
2006/0248898 A1 11/2006 Buelow et al.
2007/0089419 A1 4/2007 Matsumoto et al.
2007/0126292 A1 6/2007 Lugg
2008/0006033 A1 1/2008 Scarinci
2008/0208513 A1 8/2008 Dupuy et al.
2008/0276619 A1 11/2008 Chopra et al.
2009/0113893 A1 5/2009 Li et al.
2009/0223227 A1 9/2009 Lipinski et al.
2009/0277177 A1 11/2009 Hessler
2010/0058763 A1 3/2010 Rubio et al.
2010/0058766 A1 3/2010 McMahan et al.
2010/0077719 A1 4/2010 Wilson et al.
2010/0077752 A1 4/2010 Pipile
2010/0139280 A1 6/2010 Lacy et al.
2010/0170260 A1 7/2010 Mawatari et al.
2010/0186413 A1 7/2010 Lacy et al.
2010/0205970 A1 8/2010 Hessler et al.
2010/0223931 A1 9/2010 Chila et al.
2010/0272953 A1 10/2010 Yankowich et al.
2010/0287946 A1 11/2010 Buelow et al.
2010/0300115 A1 12/2010 Morimoto et al.
2011/0048030 A1 3/2011 Berry et al.
2011/0076628 A1 3/2011 Miura et al.
2011/0083439 A1 4/2011 Zuo et al.
2011/0179803 A1 7/2011 Berry et al.
2011/0209482 A1 9/2011 Toqan et al.
2011/0247340 A1 10/2011 Popovic et al.
2011/0252805 A1 10/2011 Berry et al.
2011/0314825 A1 12/2011 Stryapunin et al.
2012/0023949 A1 2/2012 Johnson et al.
2012/0031097 A1 2/2012 McMahan et al.
2012/0034075 A1 2/2012 Hsu et al.
2012/0036858 A1 2/2012 Lacy et al.
2012/0114868 A1 5/2012 Bunker et al.
2012/0121381 A1 5/2012 Charron et al.
2012/0121408 A1 5/2012 Lee et al.
2012/0151928 A1 6/2012 Patel et al.
2012/0151929 A1 6/2012 Patel et al.
2012/0151930 A1 6/2012 Patel et al.
2012/0174590 A1 7/2012 Krull et al.
2012/0180487 A1 7/2012 Uhm et al.
2012/0180495 A1 7/2012 Uhm et al.
2012/0198854 A1 8/2012 Schilp et al.
2013/0084534 A1 4/2013 Melton et al.
2013/0086912 A1 4/2013 Berry
2013/0104556 A1 5/2013 Uhm et al.
2013/0122438 A1 5/2013 Stoia et al.
2013/0139511 A1 6/2013 Sometani et al.
2013/0165754 A1 7/2013 McMahan
2013/0167539 A1 7/2013 Berry
2013/0180691 A1 7/2013 Jost et al.
2013/0263571 A1 10/2013 Stoia et al.
2013/0294898 A1 11/2013 Lee
2013/0299602 A1 11/2013 Hughes et al.
2013/0341430 A1* 12/2013 Hall ........................ F02C 7/232
239/533.2
2014/0007578 A1 1/2014 Genin et al.
2014/0026579 A1 1/2014 Karlsson et al.
2014/0033718 A1 2/2014 Manoharan et al.
2014/0038070 A1 2/2014 Papile
2014/0060063 A1 3/2014 Boardman et al.
2014/0109580 A1 4/2014 Giri et al.
2014/0144142 A1 5/2014 Abd-El-Nabi et al.
2014/0144152 A1 5/2014 Uhm et al.
2014/0150435 A1 6/2014 Maurer et al.
2014/0150436 A1 6/2014 Eroglu et al.
2014/0157779 A1 6/2014 Uhm et al.
2014/0186098 A1 7/2014 Mironets et al.
2014/0202163 A1 7/2014 Johnson et al.
2014/0237784 A1 8/2014 Lacy et al.
2014/0245738 A1 9/2014 Crothers et al.
2014/0250894 A1 9/2014 Petty, Sr. et al.
2014/0260256 A1 9/2014 Loebig et al.
2014/0260257 A1 9/2014 Rullaud et al.
2014/0260277 A1 9/2014 DiCintio et al.
2014/0260278 A1 9/2014 Hughes
2014/0260282 A1 9/2014 Pinnick et al.
2014/0260327 A1 9/2014 Kottilingam et al.
2014/0290255 A1 10/2014 Akagi et al.
2014/0290272 A1 10/2014 Mulcaire
2014/0338340 A1 11/2014 Melton et al.
2014/0352321 A1 12/2014 Haynes et al.
2014/0373548 A1 12/2014 Hasselqvist et al.
2015/0000286 A1 1/2015 LeBegue et al.
2015/0040579 A1 2/2015 Melton
2015/0041590 A1 2/2015 Kirtley et al.
2015/0044059 A1 2/2015 Wassynger et al.
2015/0047361 A1 2/2015 Williams et al.
2015/0059348 A1 3/2015 Toronto et al.
2015/0059357 A1 3/2015 Morgan et al.
2015/0076251 A1 3/2015 Berry
2015/0082795 A1 3/2015 Fadde et al.
2015/0082796 A1 3/2015 Andersson et al.
2015/0096305 A1 4/2015 Morgan et al.
2015/0107262 A1 4/2015 Maurer
2015/0111060 A1 4/2015 Kottilingam et al.
2015/0135716 A1 5/2015 Ginessin et al.
2015/0135718 A1 5/2015 Hughes et al.
2015/0165568 A1 6/2015 Means et al.
2015/0167983 A1 6/2015 McConnaughhay et al.
2015/0219336 A1 8/2015 Crothers et al.
2015/0369068 A1 12/2015 Kottilingam
2015/0375321 A1 12/2015 Cui et al.
2016/0033132 A1 2/2016 Venkatesan et al.
2016/0061453 A1 3/2016 Bethke
2016/0146460 A1 5/2016 Stewart et al.
2016/0146469 A1 5/2016 Lum et al.
2016/0178202 A1 6/2016 Antoniono et al.
2016/0215980 A1 7/2016 Chang
2016/0223201 A1 8/2016 Zink
2016/0369068 A1 12/2016 Reilly, Jr. et al.
2017/0038074 A1 2/2017 Myers et al.
2017/0122562 A1 5/2017 Berry
2017/0138595 A1 5/2017 Berry et al.
2017/0176014 A1 6/2017 Hughes et al.
2017/0203365 A1 7/2017 Pays et al.
2017/0219211 A1 8/2017 Kajimura et al.
2017/0232683 A1 8/2017 Alcantara Marte et al.
2017/0248318 A1 8/2017 Kulkarni
2017/0254539 A1 9/2017 Melton et al.
2017/0260997 A1 9/2017 Mola et al.
2017/0261209 A9 9/2017 Ginessin et al.
2017/0276357 A1 9/2017 Berry et al.
2017/0276358 A1 9/2017 Berry et al.
2017/0276359 A1 9/2017 Berry et al.
2017/0276360 A1 9/2017 Berry et al.
2017/0276361 A1 9/2017 Berry et al.
2017/0276362 A1 9/2017 Berry et al.
2017/0276363 A1 9/2017 Berry et al.
2017/0276364 A1 9/2017 Berry et al.
2017/0276365 A1 9/2017 Berry et al.
2017/0276366 A1 9/2017 Berry et al.
2017/0276369 A1 9/2017 Berry et al.
2017/0279357 A1 9/2017 Berry et al.
2017/0298827 A1 10/2017 Berry et al.
2017/0299185 A1 10/2017 Berry et al.
2017/0299186 A1 10/2017 Berry et al.
2017/0299187 A1 10/2017 Berry et al.
2017/0363293 A1 12/2017 Grooms et al.
2018/0149364 A1 5/2018 Berry
2018/0172276 A1 6/2018 Bailey et al.
2018/0187603 A1 7/2018 Berry

(56) References Cited

U.S. PATENT DOCUMENTS

| | | | | |
|---|---|---|---|---|
| 2018/0319077 | A1 | 11/2018 | Blanchet et al. | |
| 2018/0328187 | A1 | 11/2018 | Oke | |
| 2019/0056112 | A1 | 2/2019 | Natarajan et al. | |
| 2019/0154345 | A1 | 5/2019 | Martinez et al. | |
| 2019/0285368 | A1 | 9/2019 | Ranjan et al. | |
| 2019/0383156 | A1 * | 12/2019 | Sarawate | F01D 9/023 |
| 2020/0141583 | A1 | 5/2020 | Berry | |

FOREIGN PATENT DOCUMENTS

| | | | |
|---|---|---|---|
| EP | 1146289 | A1 | 10/2001 |
| EP | 2369235 | A2 | 9/2011 |
| EP | 2378201 | A2 | 10/2011 |
| EP | 2551597 | A2 | 1/2013 |
| EP | 2573325 | A1 | 3/2013 |
| EP | 2613002 | A2 | 7/2013 |
| EP | 2672182 | A2 | 12/2013 |
| EP | 2685172 | A1 | 1/2014 |
| EP | 2716396 | A1 | 4/2014 |
| EP | 2716868 | A2 | 4/2014 |
| EP | 2722509 | A1 | 4/2014 |
| EP | 2762784 | A1 | 8/2014 |
| EP | 2863018 | A1 | 4/2015 |
| EP | 2905538 | A1 | 8/2015 |
| JP | S62156287 | U | 10/1987 |
| JP | 3774491 | B2 | 5/2006 |
| JP | 2011/058775 | A | 3/2011 |
| WO | WO1999/064791 | A1 | 12/1999 |
| WO | WO2004/035187 | A2 | 4/2004 |
| WO | WO2005/024204 | A1 | 3/2006 |
| WO | WO2007/035298 | A2 | 3/2007 |
| WO | WO2008/076947 | A2 | 6/2008 |
| WO | WO2011/130001 | A2 | 10/2011 |
| WO | WO2014/191495 | A1 | 12/2014 |
| WO | WO2015/057288 | A1 | 4/2015 |

* cited by examiner

INTEGRATED COMBUSTION NOZZLE HAVING A UNIFIED HEAD END

FIELD

The present disclosure relates generally to an integrated combustion nozzle for a gas turbine engine. More specifically, this disclosure relates to a compact integrated combustion nozzle having a unified two stage combustion system.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Turbomachine combustion systems usually burn hydrocarbon fuels and produce air polluting emissions such as oxides of nitrogen (NOx) and carbon monoxide (CO). Oxidization of molecular nitrogen in the turbomachine depends upon the temperature of gas located in a combustor, as well as the residence time for reactants located in the highest temperature regions within the combustor. Thus, the amount of NOx produced by the turbomachine may be reduced or controlled by either maintaining the combustor temperature below a temperature at which NOx is produced, or by limiting the residence time of the reactant in the combustor.

One approach for controlling the temperature of the combustor involves pre-mixing fuel and air to create a fuel-air mixture prior to combustion. This approach may include the axial staging of fuel injectors where a first fuel-air mixture is injected and ignited at a first or primary combustion zone of the combustor to produce a main flow of high energy combustion gases, and where a second fuel-air mixture is injected into and mixed with the main flow of high energy combustion gases via a plurality of radially oriented and circumferentially spaced fuel injectors or axially staged fuel injector assemblies positioned downstream from the primary combustion zone. The injection of the second fuel-air mixture into the secondary combustion zone is sometimes referred to as a "jet-in-crossflow" arrangement.

Axially staged injection increases the likelihood of complete combustion of available fuel, which in turn reduces the air polluting emissions. However, with conventional axially staged fuel injection combustion systems, there are multiple components having complex geometries that are difficult and time consuming to assemble. Thus, scaling the axially staged combustors, e.g., from a large combustor to a small combustor, can be difficult due to the room required for the assembly. Therefore, an improved gas turbine combustion system which includes axially staged fuel injection and is capable of being fully scaled would be useful in the industry.

BRIEF DESCRIPTION

Aspects and advantages of the integrated combustion nozzles and turbomachines in accordance with the present disclosure will be set forth in part in the following description, or may be obvious from the description, or may be learned through practice of the technology.

In accordance with one embodiment, an integrated combustion nozzle is provided. The integrated combustion nozzle includes a combustion liner that extends along a radial direction between an inner liner segment and an outer liner segment. The combustion liner includes a forward end portion axially separated from an aft end portion. The combustion liner further includes a first side wall and a second side wall. The aft end portion of the combustion liner defines a turbine nozzle. The first side wall and the second side wall each define an opening that extends both axially and radially. The integrated combustion nozzle further includes a unified head end coupled to the combustion liner. The unified head end is in fluid communication with a fuel supply. The unified head end includes a first fuel nozzle and a second fuel nozzle disposed at the forward end portion of the combustion liner. A fuel plenum is defined between the first fuel nozzle and the second fuel nozzle. A first liner portion extends from the first fuel nozzle and into the opening of the first wall such that the first liner portion forms a continuous surface with the first wall of the combustion liner. The unified head end further includes a second liner portion that extends from the second fuel nozzle and into the opening of the second wall such that the second liner portion forms a continuous surface with the second wall of the combustion liner.

In accordance with another embodiment, a turbomachine is provided. The turbomachine includes a compressor section and a compressor discharge casing disposed downstream from the compressor section. A turbine section is disposed downstream from the compressor discharge casing. The turbomachine further includes an annular combustion system disposed within the compressor discharge casing. The annular combustion system includes a plurality of integrated combustion nozzles disposed in an annular array about an axial centerline of the turbomachine. Each integrated combustion nozzle includes a combustion liner extending along a radial direction between an inner liner segment and an outer liner segment. The combustion liner includes a forward end portion axially separated from an aft end portion. The combustion liner further includes a first side wall and a second side wall. The aft end portion of the combustion liner defines a turbine nozzle. The first side wall and the second side wall each define an opening that extends both axially and radially. The integrated combustion nozzle further includes a unified head end coupled to the combustion liner. The unified head end is in fluid communication with a fuel supply. The unified head end includes a first fuel nozzle and a second fuel nozzle disposed at the forward end portion of the combustion liner. A fuel plenum is defined between the first fuel nozzle and the second fuel nozzle. A first liner portion extends from the first fuel nozzle and into the opening of the first wall such that the first liner portion forms a continuous surface with the first wall of the combustion liner. The unified head end further includes a second liner portion that extends from the second fuel nozzle and into the opening of the second wall such that the second liner portion forms a continuous surface with the second wall of the combustion liner.

These and other features, aspects and advantages of the present integrated combustion nozzles and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present integrated combustion nozzles and turbomachines, including the best mode of making and using the present systems and methods, directed to one of ordinary skill in the art, is set forth in the specification, which makes reference to the appended figures, in which.

DETAILED DESCRIPTION

Figure 1:
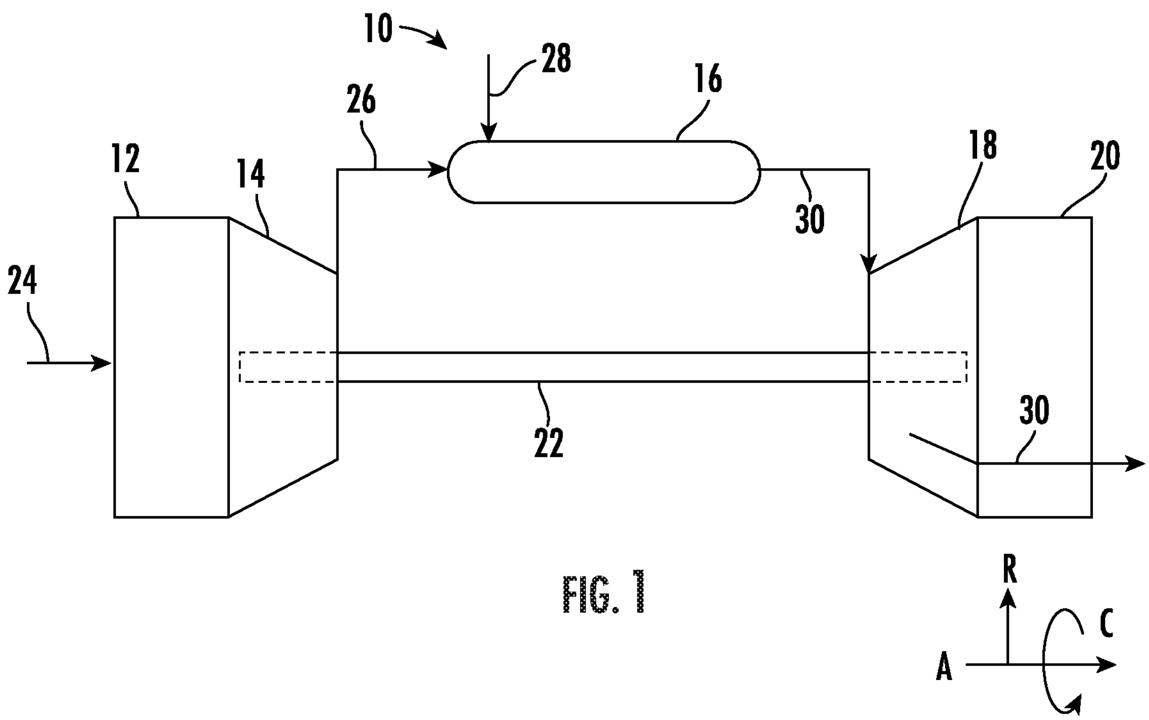
FIG. 1 is a schematic illustration of a turbomachine, in accordance with embodiments of the present disclosure.

Reference now will be made in detail to embodiments of the present integrated combustion nozzles and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms “first”, “second”, and “third” may be used interchangeably to distinguish one component from another and are not intended to signify location or importance of the individual components.

As used herein, the terms “upstream” (or “forward”) and “downstream” (or “aft”) refer to the relative direction with respect to fluid flow in a fluid pathway. For example, “upstream” refers to the direction from which the fluid flows, and “downstream” refers to the direction to which the fluid flows. The term “radially” refers to the relative direction that is substantially perpendicular to an axial centerline of a particular component, the term “axially” refers to the relative direction that is substantially parallel and/or coaxially aligned to an axial centerline of a particular component and the term “circumferentially” refers to the relative direction that extends around the axial centerline of a particular component. terms of approximation, such as “generally,” “substantially,” or “about” include values within ten percent greater or less than the stated value. When used in the context of an angle or direction, such terms include within ten degrees greater or less than the stated angle or direction. For example, “generally vertical” includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 into the turbine 18, wherein energy (kinetic and/or thermal) is transferred from the combustion gases 30 to rotor blades (not shown), thus causing shaft 22 to rotate. The mechanical rotational energy may then be used for various purposes, such as to power the compressor 14 and/or to generate electricity. The combustion gases 30 exiting the turbine 18 may then be exhausted from the gas turbine 10 via the exhaust section 20.

Figure 2:
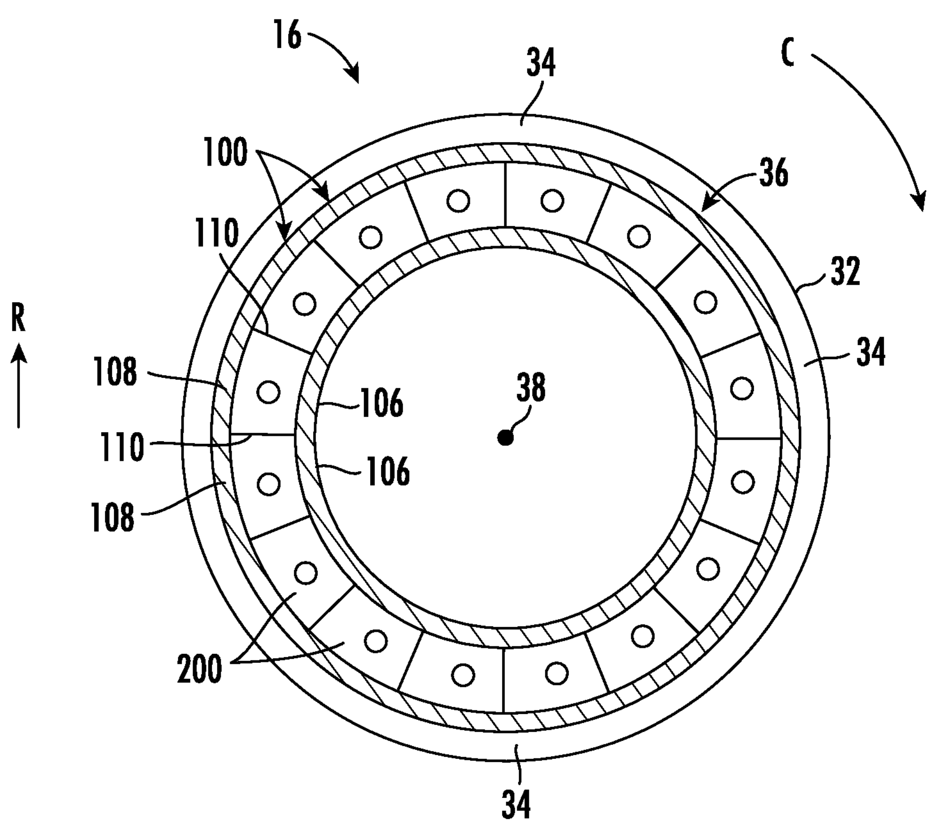
FIG. 2 is an upstream view of an exemplary combustion section of a turbomachine, in accordance with embodiments of the present disclosure.

Also shown in FIG. 1 is the shaft 22 which is coincident with the axial centerline 38 (FIG. 2). The axial centerline 38 defines an axial direction substantially parallel to and/or along an axial direction A, a radial direction R perpendicular to the axial direction A, and a circumferential direction C extends around the axial direction A.

FIG. 2 provides an upstream view of the combustion section 16, according to various embodiments of the present disclosure. As shown in FIG. 2, the combustion section 16 may be at least partially surrounded by an outer or compressor discharge casing 32. The compressor discharge casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. In various embodiments, as shown in FIG. 2, the combustion section 16 includes a segmented annular combustion system 36 that includes a number of integrated combustion nozzles 100 arranged circumferentially around an axial centerline 38 of the gas turbine 10, which may be coincident with the gas turbine shaft 22.

Figure 3:
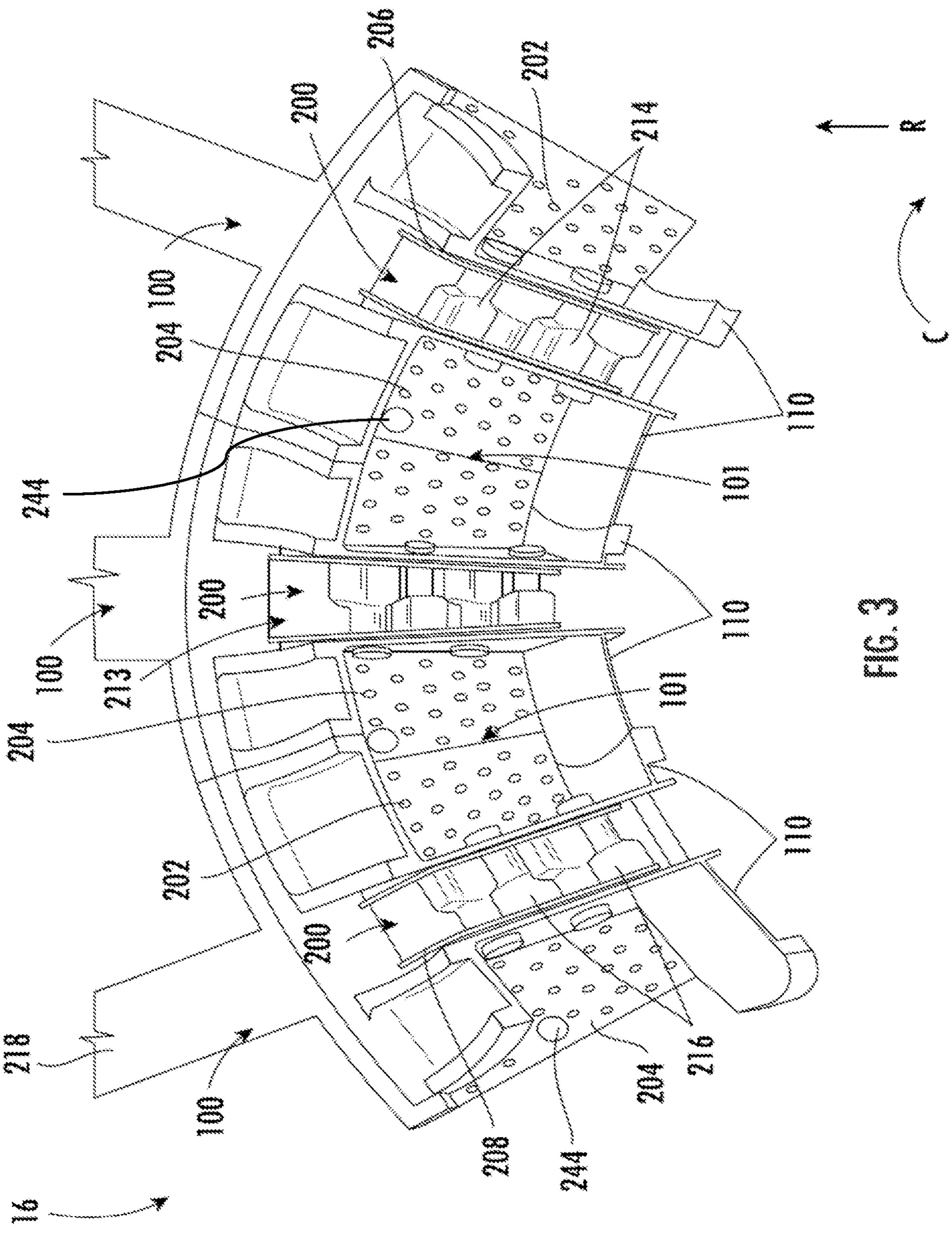
FIG. 3 is an upstream cross-sectional view of a portion of a combustion section of a turbomachine, in accordance with embodiments of the present disclosure.
Figure 6:
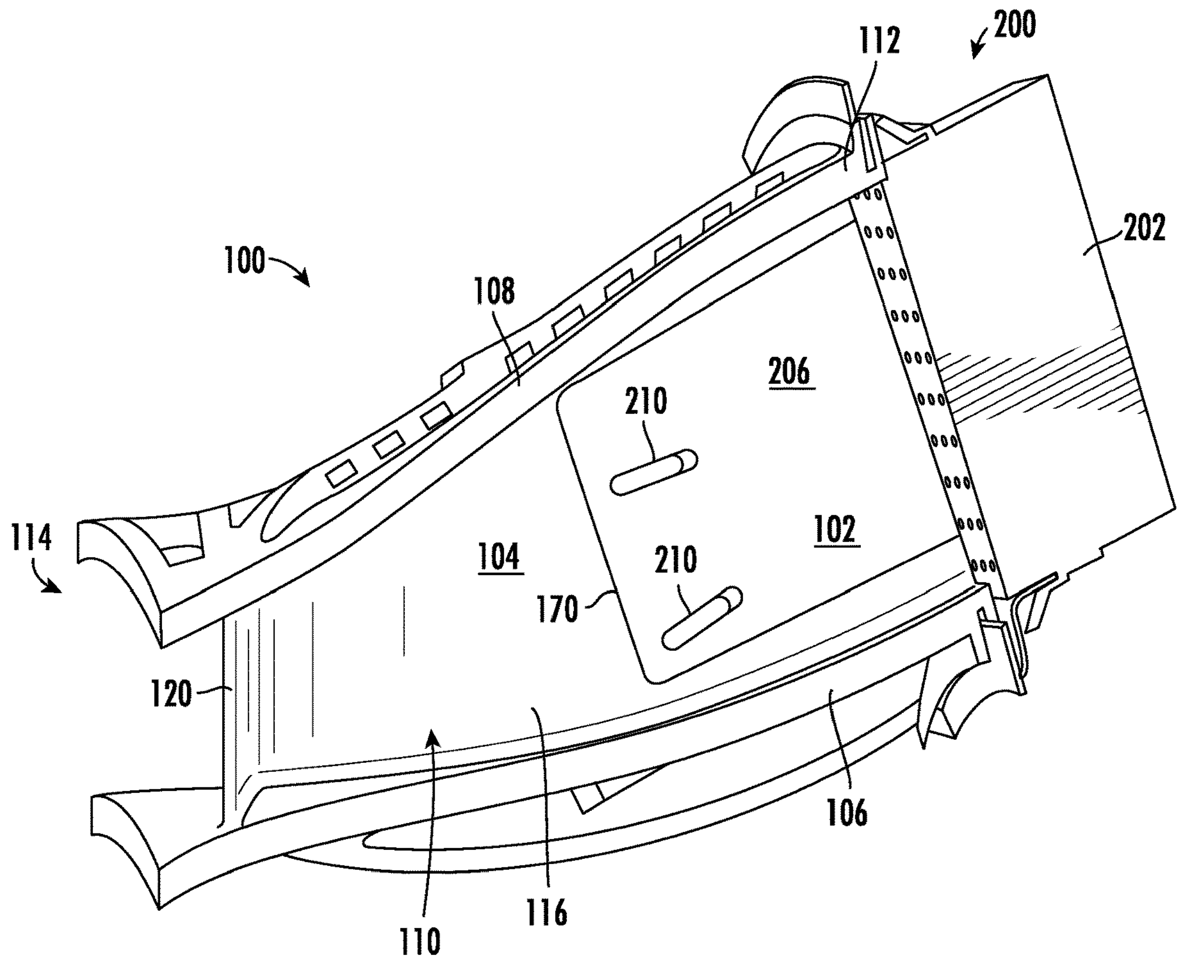
FIG. 6 is a perspective view of an integrated combustion nozzle, as viewed from a first side, in accordance with embodiments of the present disclosure.
Figure 7:
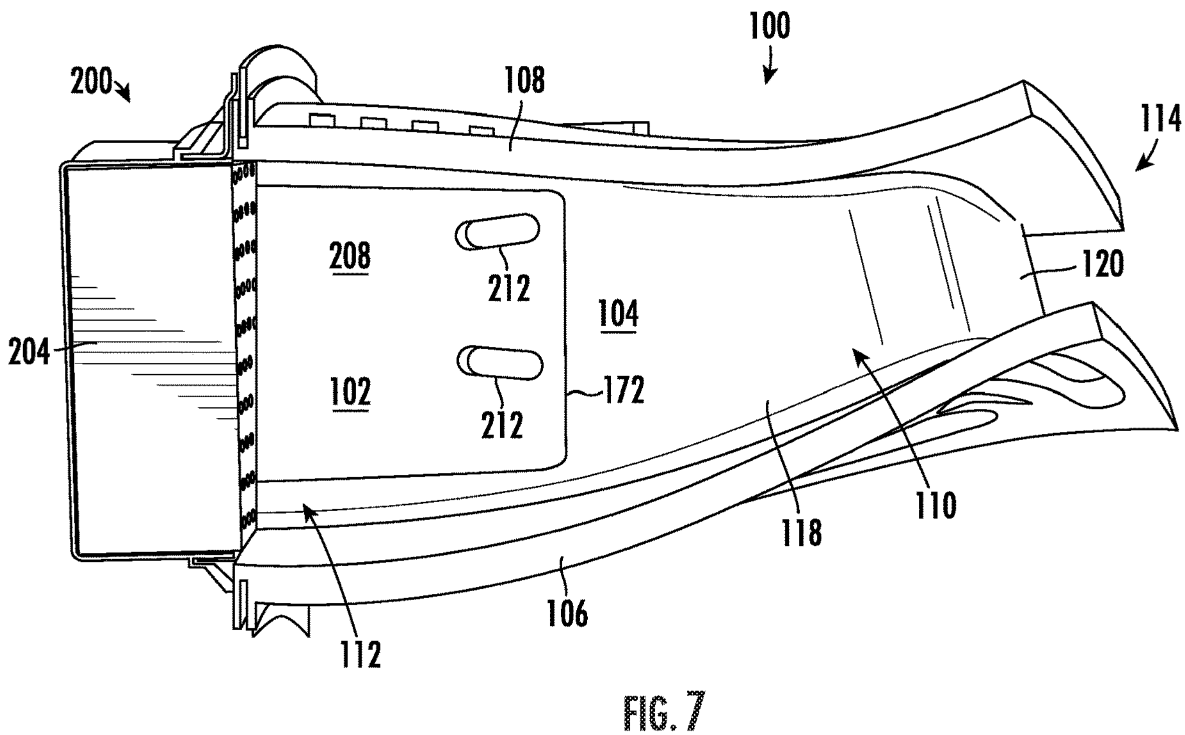
FIG. 7 is a perspective view of an integrated combustion nozzle, as viewed from a second side, in accordance with embodiments of the present disclosure.

FIG. 3 illustrates a cross-sectional view of a portion of the combustor section 16, as viewed from along the axial direction A of the gas turbine 10, in accordance with embodiments of the present disclosure. As shown in FIG. 3, each integrated combustion nozzle 100 (three of which are shown in FIG. 3), may couple together to form localized combustion zones 101, which are isolated from one another and disposed upstream of the turbine section 18, e.g., the primary combustion zone 102 and the secondary combustion zone 104 (FIGS. 6 and 7). Although FIG. 3 illustrates three integrated combustion nozzles 100, the combustion section 16 may include enough integrated combustion nozzles 100 to circumferentially surround the axial centerline 38 of the gas turbine 10 (FIG. 2).

In exemplary embodiments, as shown in FIG. 3, each of the integrated combustion nozzles 100 may include a combustion liner 110 and a unified head end 200 that couples to the forward end of the combustion liner 110. As discussed below in more detail, each unified head end 200 may be in fluid communication with a fuel supply 224 (FIG. 4) and may include a first fuel nozzle 202, a second fuel nozzle 204, and a fuel injection assembly 213 positioned downstream from the first fuel nozzle 202 and the second fuel nozzle 204. As shown, the first fuel nozzle 202 of each unified head end 200 may be positioned immediately adjacent, and in contact with, the second fuel nozzle 204 of a neighboring unified head end 200, in order to inject a first combustible mixture of fuel and air into the localized combustion zone 101. In various embodiments, the fuel injection assembly 213 may include a first set of fuel injectors 214 and a second set of fuel injectors 216 disposed downstream from the fuel nozzles 202, 204 and operable to inject a second combustible flow of fuel and air into two separate localized combustion zones 101.

In many embodiments, the first set of fuel injectors 214 and the second set of fuel injectors 216 may be oriented opposite one another, such that they each extend through opposite ends of the unified head end 200 and into respective localized combustion zones 101, in order to inject a second combustible mixture of fuel and air into two separate neighboring localized combustion zones 101.

As shown in FIGS. 3-8 collectively, the unified head end 200 may further include a first liner portion 206 and a second liner portion 208, which extend from the first fuel nozzle 202 and the second fuel nozzle 204 respectively. In many embodiments, the first liner portion 206 may define pressure side injection outlets 210, through which the first set of fuel injectors 214 extend, in order to inject a second flow of fuel and air into the localized combustion zone 101. Similarly, the second liner portion 208 may define suction side injection outlets 212, through which the second set of fuel injectors 216 extend, in order to inject a second flow of fuel and air into the localized combustion zone 101. In this way, the first set of fuel injectors 214 of a unified head end 200 and the second set of fuel injectors 216 of an immediately neighboring unified head end 200 may extend into a common localized combustion zone 101.

Figure 4:
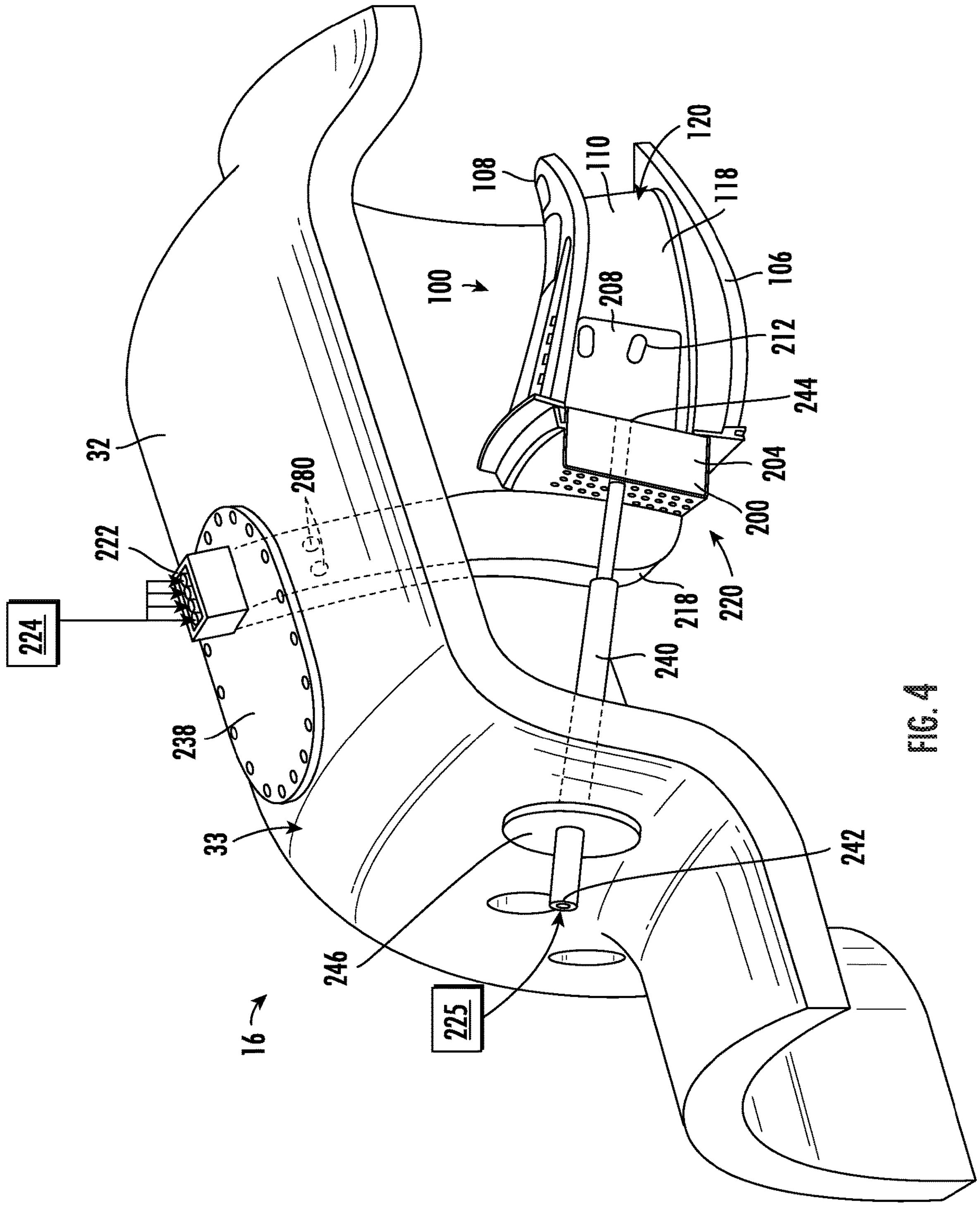
FIG. 4 is a cross-sectional perspective view of a portion of a combustion section of a turbomachine, in accordance with embodiments of the present disclosure.

FIG. 4 illustrates a perspective cross-sectional view of a portion the combustion section 16. As shown, a support tube 218 may couple the integrated combustion nozzle 100 to the compressor discharge casing 32. In particular embodiments, the support tube 218 may be a hollow body that surrounds at least one fuel conduit. For example, in many embodiments, the support tube 218 may couple to a forward end 220 of the unified head end 200. In various embodiments, the support tube 218 may extend from the forward end 220 of the unified head end 200, through the compressor discharge casing 32, in order to provide a protected path for the fuel supply conduits 222 to extend. In some embodiments, a flange 238 may couple the support tube 218 to an outer surface 33 of the compressor discharge casing 32. In exemplary embodiments, the support tube 218 may surround at least one fuel supply conduit 222. The at least one fuel supply conduit 222 may be fluidly coupled to a forward end 220 of the head end assembly 200, such as coupled to one of a fuel nozzle inlet 226 or a fuel injector inlet 228 (FIG. 9) at the forward end 220 of the head end assembly 200.

In many embodiments, a liquid fuel cartridge 240 may extend through one of the first fuel nozzle 202 or the second fuel nozzle 204. For example, as shown in FIG. 4, the liquid fuel cartridge 240 extends through the second fuel nozzle 204, in order to inject a flow of liquid fuel into the localized combustion zone 101. In particular embodiments, the liquid fuel cartridge may extend from an inlet 242, through the compressor discharge casing 32 and one of the first fuel nozzle 202 or the second fuel nozzle 204, to an outlet 244 disposed within the localized combustion zone 101. As shown, the liquid fuel cartridge 240 may be coupled to the compressor discharge casing 32 via a mounting flange 246. In particular embodiments, the liquid fuel cartridge 240 may be coupled to the outer surface 33 of the compressor discharge casing 32 via the mounting flange 246. In some embodiments, as shown, the liquid fuel cartridge 240 may be in fluid communication with a liquid fuel supply 225 in order to convey a flow of liquid fuel into the combustion chamber. In other embodiments, the liquid fuel cartridge may be in fluid communication with the fuel supply 224.

Figure 5:
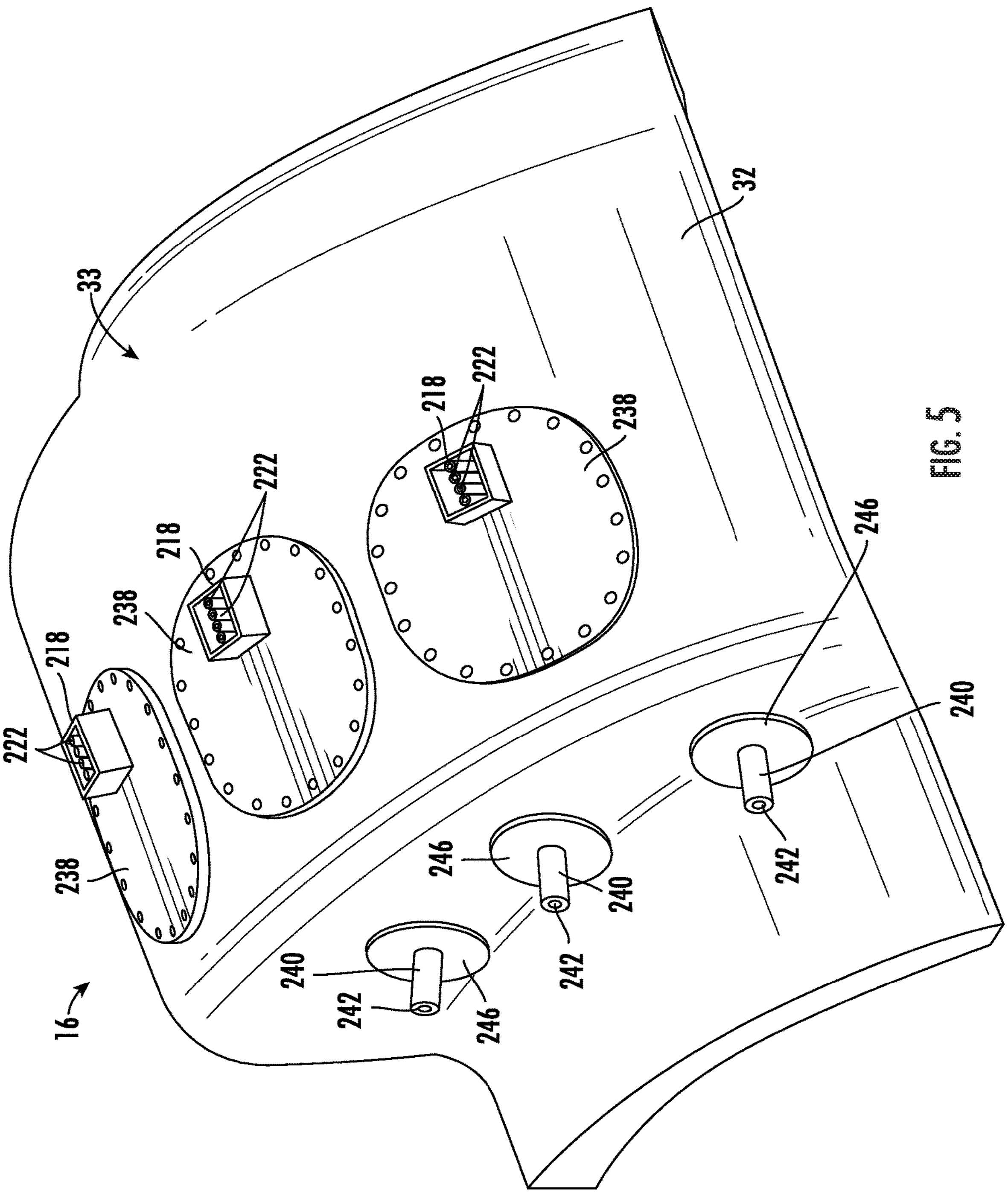
FIG. 5 is a perspective view of a portion of a compressor discharge casing, in accordance with embodiments of the present disclosure.

FIG. 5 illustrates a perspective view of a portion of the combustion section 16, in accordance with embodiments of the present disclosure. As shown, each of the liquid fuel cartridges 240 may be circumferentially spaced apart from one another and coupled to the compressor discharge casing 32, such that they each extend through the compressor discharge casing 32 and into a respective localized combustion zone 101. Similarly, each of the support tubes 218 may be circumferentially spaced apart from one another and coupled to the compressor discharge casing via the flange 238, such that they each extend from the compressor discharge casing to a respective integrated combustion nozzle 100. In this way, each of the support tubes 218 may provide a protective path for the at least one fluid supply conduits 222 that advantageously shields the conduits from the heat of the combustion section 16.

FIG. 6 provides a perspective view of an integrated combustion nozzle 100, as viewed from a first side. Similarly, FIG. 7 provides a perspective view of an integrated combustion nozzle 100, as viewed from a second side, in accordance with embodiments of the present disclosure. As shown collectively in FIGS. 2, 3 and 4, the segmented annular combustion system 36 includes a plurality of integrated combustion nozzles 100. As described further herein, each combustor nozzle 100 includes a first side wall 116 and a second side wall 118. In particular embodiments, the first side wall is a pressure side wall, while the second side wall is a suction side wall, based on the integration of the side walls with corresponding pressure and suction sides of a downstream turbine nozzle 120. It should be understood that any references made herein to pressure side walls and suction side walls are representative of particular embodiments, such references being made to facilitate discussion, and that such references are not intended to limit the scope of any embodiment, unless specific context dictates otherwise.

As shown collectively in FIGS. 6 and 7, each circumferentially adjacent pair of combustor nozzles 100 defines a respective primary combustion zone 102 and a respective secondary combustion zone 104 therebetween, thereby forming an annular array of primary combustion zones 102 and secondary combustion zones 104. The primary combustion zones 102 and the secondary combustion zones 104 are circumferentially separated, or fluidly isolated, from adjacent primary combustion zones 102 and secondary combustion zones 104, respectively, by the combustion liners 110.

Each combustor nozzle 100 includes an inner liner segment 106, an outer liner segment 108, and a hollow or semi-hollow combustion liner 110 that extends between the inner liner segment 106 and the outer liner segment 108. It is contemplated that more than one (e.g., 2, 3, 4, or more) combustion liners 110 may be positioned between the inner liner segment 106 and the outer liner segment 108, thereby reducing the number of joints between adjacent liner segments that require sealing. For ease of discussion herein, reference will be made to integrated combustion nozzles 100 having a single combustion liner 110 between respective inner and outer liner segments 106, 108, although a 2:1 ratio of liner segments to combustion liners is not required. As shown in FIGS. 6 and 7, each combustion liner 110 includes forward or upstream end portion 112, an aft or downstream end portion 114, a first side wall 116, which is a pressure side wall in the particular example embodiment illustrated in FIG. 6 and a second side wall 118, which is a suction side wall in the particular example embodiment illustrated in FIG. 7.

In exemplary embodiments, the integrated combustion nozzle 100 further includes a unified head end 200 coupled to the combustion liner 110 at the forward end 112. In the illustrated example embodiment, the unified head end 200 includes a first fuel injector 202 and a second fuel injector 204. As shown, the unified head end 204 is configured for installation in the forward end portion 112 of a respective combustion liner 110. As shown in FIG. 3, when the integrated combustion nozzle 100 is installed within a combustion section 16, the first fuel injector 202 may contact the second fuel injector 204 of an adjacent integrated combustion nozzle 100, in order to collectively form the upstream end of a localized combustion zone 101. The first fuel injector 202 and the second fuel injector 204 may be referred to as a "bundled tube fuel nozzle." However, the fuel nozzles 202, 204 may include or comprise any type of fuel nozzle or burner (such as a swirling fuel nozzle or swozzle), and the claims should be not limited to a bundled tube fuel nozzle unless specifically recited as such.

Each of the fuel nozzles 202, 204 may extend at least partially circumferentially between two circumferentially adjacent combustion liners 110 and/or at least partially radially between a respective inner liner segment 106 and outer liner segment 108 of the respective combustor nozzle 100. During axially staged fuel injection operation, fuel nozzles 202, 204 each provide a stream of premixed fuel and air (that is, a first combustible mixture) to the respective primary combustion zone 102.

In at least one embodiment, as shown in FIGS. 6 and 7, the downstream end portion 114 of one or more of the combustion liners 110 transitions into a generally airfoil-shaped turbine nozzle 120, which directs and accelerates the flow of combustion products toward the turbine blades. Thus, the downstream end portion 114 of each combustion liner 110 may be considered an airfoil without a leading edge. When the integrated combustion nozzles 100 are mounted within the combustion section 16, the turbine nozzle 120 may be positioned immediately upstream from a stage of turbine rotor blades of the turbine 18.

As used herein, the term "integrated combustion nozzle" refers to a seamless structure that includes the combustion liner 110, the turbine nozzle 120 downstream of the combustion liner, the inner liner segment 106 extending from the forward end 112 of the combustion liner 110 to the aft end 114 (embodied by the turbine nozzle 120), and the outer liner segment 108 extending from the forward end 112 of the combustion liner 110 to the aft end 114 (embodied by the turbine nozzle 120). In at least one embodiment, the turbine nozzle 120 of the integrated combustion nozzle 100 functions as a first-stage turbine nozzle and is positioned upstream from a first stage of turbine rotor blades.

As described above, one or more of the integrated combustion nozzles 100 is formed as an integral, or unitary, structure or body that includes the inner liner segment 106, the outer liner segment 108, the combustion liner 110, and the turbine nozzle 120. The integrated combustion nozzle 100 may be made as an integrated or seamless component, via casting, additive manufacturing (such as 3D printing), or other manufacturing techniques. By forming the combustor nozzle 100 as a unitary or integrated component, the need for seals between the various features of the combustor nozzle 100 may be reduced or eliminated, part count and costs may be reduced, and assembly steps may be simplified or eliminated. In other embodiments, the combustor nozzle 100 may be fabricated, such as by welding, or may be formed from different manufacturing techniques, where components made with one technique are joined to components made by the same or another technique.

In particular embodiments, at least a portion or all of each integrated combustion nozzle 100 may be formed from a ceramic matrix composite (CMC) or other composite material. In other embodiments, a portion or all of each integrated combustion nozzle 100 and, more specifically, the turbine nozzle 120 or its trailing edge, may be made from a material that is highly resistant to oxidation (e.g., coated with a thermal barrier coating).

In another embodiment (not shown), at least one of the combustion liners 110 may taper to a trailing edge that is aligned with a longitudinal (axial) axis of the combustion liner 110. That is, the combustion liner 110 may not be integrated with a turbine nozzle 120. In these embodiments, it may be desirable to have an uneven count of combustion liners 110 and turbine nozzles 120. The tapered combustion liners 110 (i.e., those without integrated turbine nozzles 120) may be used in an alternating or some other pattern with combustion liners 110 having integrated turbine nozzles 120 (i.e., integrated combustion nozzles 100).

In particular embodiments, as shown in FIGS. 6 and 7, the unified head end 200 may further include a first liner portion 206 and a second liner portion 208. The first liner portion 206 and the second liner portion 208 may each extend generally axially from the unified head end 200 and at least partially form the primary combustion zone 102. For example, the first liner portion 206 may extend from the first fuel nozzle 202, such that it aligns with, and forms a continuous surface with, the pressure side wall 116. Similarly, the second liner portion 208 may extend from the second fuel nozzle 204, such that it aligns with, and forms a continuous surface with, the suction side wall 118.

In many embodiments, as shown in FIG. 6, the first liner portion 206 of each unified head end 200 may define one or more pressure side injection outlets 210, through which a first set of fuel injectors 214 may extend in order to inject a second combustible mixture of fuel and air into the secondary combustion zone 104. Likewise, as shown in FIG. 7, the second liner portion 208 of each unified head end 200 may define one or more suction side injection outlets 212, through which a second set of fuel injectors 216 may extend in order to inject a second combustible mixture of fuel and air into the secondary combustion zone 104. Each respective primary combustion zone 102 is defined upstream from the corresponding pressure side injection outlets 210 and/or suction side injection outlets 212 of a pair of circumferentially adjacent integrated combustion nozzles 100. Each secondary combustion zone 104 is defined downstream from the corresponding pressure side injection outlets 210 and/or suction side injection outlets 212 of the pair of circumferentially adjacent integrated combustion nozzles 100.

Although the pressure side injection outlets 210 are shown in FIGS. 6 and 7 as residing in a common radial or injection plane with respect to an axial centerline of the integrated combustion nozzle 100 or at a common axial distance from the downstream end portion 114 of the combustion liner 110, in particular embodiments, one or more of the pressure side injection outlets 210 may be staggered axially with respect to radially adjacent pressure side injection outlets 210, thereby off-setting the axial distances of the pressure side injection outlets 210 to the downstream end portion 114 for particular pressure side injection outlets 210. Similarly, although FIG. 7 illustrates the suction side injection outlets 212 in a common radial or injection plane or at a common axial distance from the downstream end portion 114 of the combustion liner 110, in particular embodiments, one or more of the suction side injection outlets 212 may be staggered axially with respect to radially adjacent suction side injection outlets 212, thereby off-setting the axial distances of the pressure side injection outlets 212 to the downstream end portion 114 for particular suction side injection outlets 212.

Figure 8:
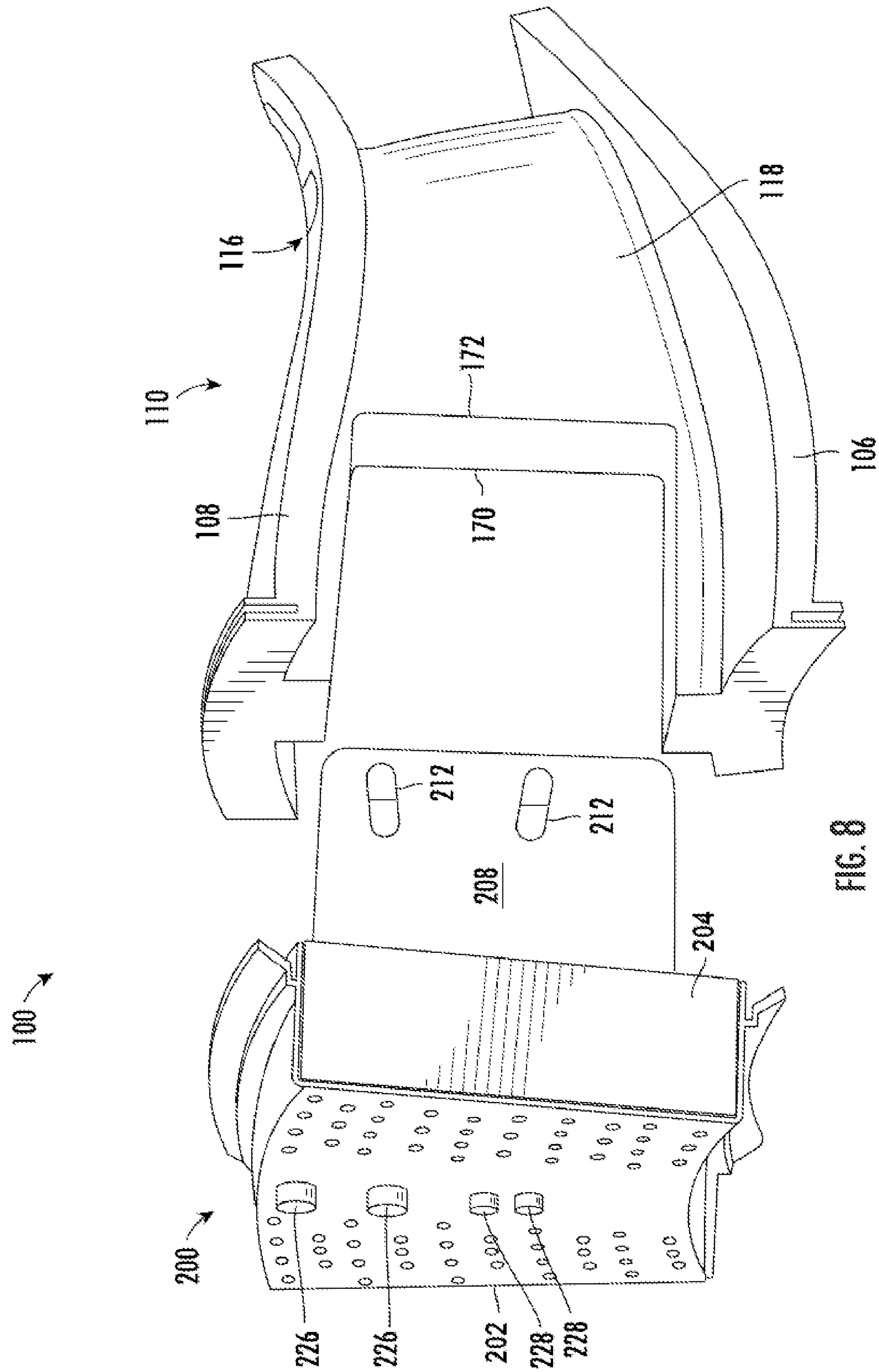
FIG. 8 is a perspective view of an integrated combustion nozzle, which is shown having a unified head end exploded away, in accordance with embodiments of the present disclosure.

FIG. 8 illustrates a perspective view of an integrated combustion nozzle 100, in which the combustion liner 110 is exploded away from the unified head end 200, in accordance with embodiments of the present disclosure. As shown, the combustion liner 110 may define openings 170 and 172, in order for the unified head end 200 to couple thereto and partially define the primary combustion zone 102 and secondary combustion zone 104. More specifically, the pressure side wall 116 may define an opening 170, which may be a generally rectangular shaped cut out that corresponds to the shape of the first liner portion 206. Likewise, the suction side wall 118 may define an opening 172, which may be a generally rectangular shaped cut out that corresponds to the shape of the second liner portion 208. In many embodiments, the first liner portion 206 may be slidably received by the opening 170 of the pressure side wall 116, and the second liner portion 208 may be slidably received by the opening 172 of the suction side wall 118.

When the unified head end 200 is in an installed position (FIGS. 6 and 7), the first liner portion 206 may form a continuous surface with the pressure side wall 116, such that there are no sharp changes in the contour between the pressure side wall 116 and the first liner portion 206. In many embodiments, the first liner portion 206 may be a substantially flat plate that extends both radially and axially and corresponds to the shape of the opening 170. For example, the first liner portion may fill the opening 170, in order to partially define both the primary combustion zone 102 and the secondary combustion zone 104. Likewise, when the unified head end 200 is in an installed position, the second liner portion 208 may form a continuous surface with the suction side wall 118, such that there are no sharp changes in the contour between the suction side wall 118 and the second liner portion 208. In many embodiments, the second liner portion 208 may be a substantially flat plate that extends both radially and axially and corresponds to the shape of the opening 172. For example, the second liner portion 208 may fill the opening 172, in order to partially define both the primary combustion zone 102 and the secondary combustion zone 104.

Figure 9:
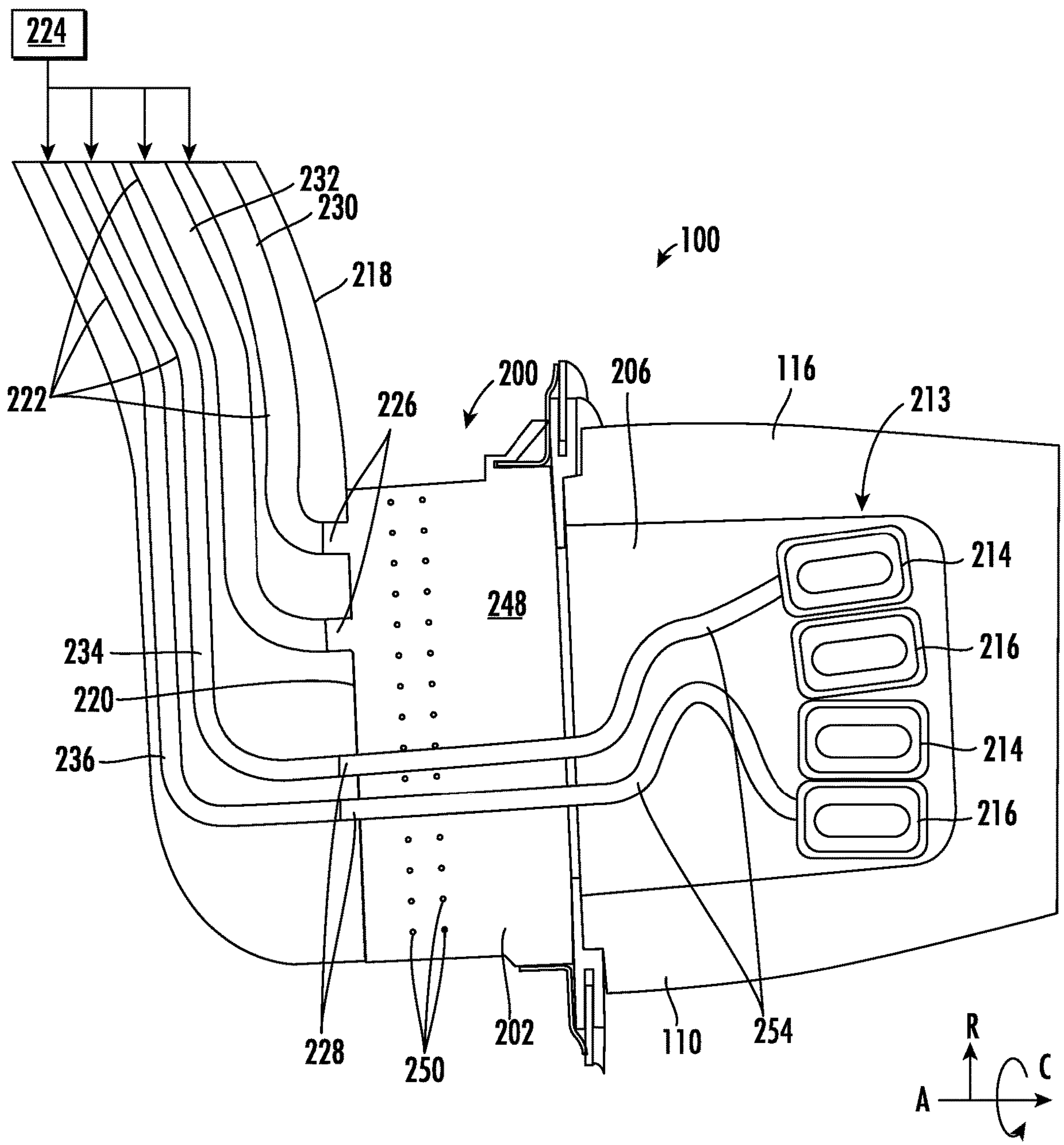
FIG. 9 is a cross-sectional view of an integrated combustion nozzle from along a circumferential direction C of a gas turbine, in accordance with embodiments of the present disclosure.
Figure 10:
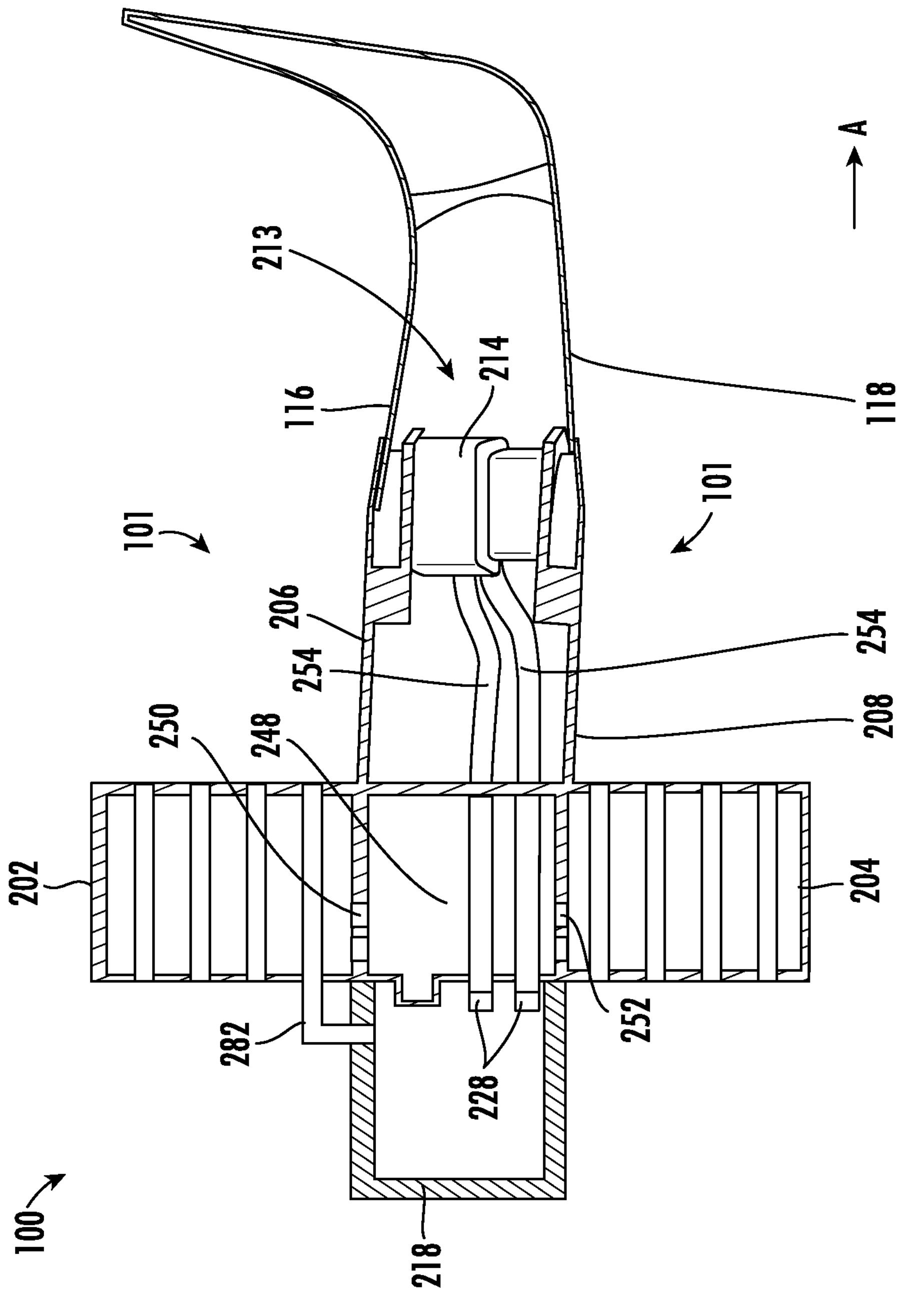
FIG. 10 is a perspective cross-sectional view of an integrated combustion nozzle, in accordance with embodiments of the present disclosure.

FIG. 9 illustrates a cross-sectional view of an integrated combustion nozzle 100 from along the circumferential direction C of the gas turbine 10 (circumferentially between the pressure side wall 116 and the suction side wall 118), and FIG. 10 illustrates a cross-sectional view of an integrated combustion nozzle 100 from along the radial direction R, in accordance with embodiments of the present disclosure. As shown in FIGS. 9 and 10 collectively, the fuel injection assembly 213 may be positioned downstream from the first fuel nozzle 202 and the second fuel nozzle 204, such that the fuel injection assembly advantageously provides a second flow of fuel and air into the combustion chamber.

In many embodiments, the unified head end 200 may further define a fuel plenum 248 axially between the forward end 220 of the unified head end 200 and the fuel injection assembly 213. In many embodiments, the fuel plenum 248 may be defined between the first fuel nozzle 202 and the second fuel nozzle 204 in the circumferential direction C.

In various embodiments, as shown in FIG. 9, the at least one fuel supply conduit 222 may include a first fuel nozzle supply conduit 230 coupled to a fuel nozzle inlet 226 at a forward end 220 of the unified head end 200, a second fuel nozzle supply conduit 232 coupled to another fuel nozzle inlet 226 at the forward end 220 of the unified head end 200, a first fuel injector supply conduit 234 coupled to a fuel injector inlet 228 at the forward end 220 of the unified head end 200, and a second fuel injector supply conduit 236 coupled to another fuel injector inlet 228 at the forward end 220 of the unified head end 200.

In many embodiments, the support tube 218 may surround each of the conduits 230, 232, 234, 236, such that the support tube 218 provides for a thermal barrier between the high temperature compressed air 26 in the high pressure plenum 34 and the conduits 230, 232, 234, 236 containing cold temperature fuel. In exemplary embodiments, each of the conduits 230, 232, 234, 236 may be a solid hollow tube, i.e. they do not include a compliant bellows, which advantageously reduces both component cost and assembly time.

As shown in FIG. 9, the fuel nozzle inlet 226 may be defined by the unified head end 200. In many embodiments, fuel nozzle inlet 226 may be in fluid communication with both the fuel supply 224 and the fuel plenum 248, such that fuel from the fuel supply 224 is delivered to the fuel plenum 248 via the fuel inlet 226. As shown in FIGS. 9 and 10 collectively, a first plurality of fuel ports 250 may extend between the fuel plenum 248 and the first fuel nozzle 202, such that the first fuel nozzle 202 is in fluid communication with the fuel plenum 248 via the first plurality of fuel ports 250. Similarly, a second plurality of fuel ports 252 may extend between the fuel plenum 248 and the second fuel nozzle 204, such that the second fuel nozzle 204 is in fluid communication with the fuel plenum 248 via the second plurality of fuel ports 252.

In exemplary embodiments, as shown in FIGS. 9 and 10 collectively, the unified head end 200 may define at least one fuel circuit 254 in fluid communication with the fuel supply 224 and the fuel injection assembly 213. As shown, the at least one fuel circuit 224 may from a fuel injector inlet 228 through the fuel plenum to the fuel injection assembly. In the embodiment shown in FIGS. 9 and 10, the unified head end 200 includes two fuel circuits 254 that provide for fluid communication between the fuel supply 224 and the fuel injection assembly 213, e.g., one fuel circuit 254 may convey fuel to the first set of fuel injectors 214 while another fuel circuit 254 conveys fuel to the second set of fuel injectors 216. In other embodiments (not shown), the unified head end 200 may include more or less fuel circuits depending on the number of fuel injectors.

In many embodiments, the unified head end may be integrally formed as a single component. That is, each of the subcomponents, e.g., the fuel nozzles 202, 204, liner portions 206, 208, fuel injection assembly 213, and any other subcomponent of the unified head end 200, may be manufactured together as a single body. In exemplary embodiments, this may be done by utilizing an additive manufacturing system. However, in other embodiments, other manufacturing techniques, such as casting or other suitable techniques, may be used. In this regard, utilizing additive manufacturing methods, each unified head end 200 may be integrally formed as a single piece of continuous metal, and may thus include fewer sub-components and/or joints compared to prior designs. The integral formation of each unified head end 200 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

The unified head end 200 described herein defines both the primary form of fuel/air delivery to the combustion zone and the secondary form of fuel/air delivery to the combustion zone. Specifically, the unified head end 200 may define both the fuel nozzles 202, 204, the fuel injection assembly 213, and the means for conveying fuel from a fuel supply 224 to said fuel nozzles 202, 204 and fuel injection assembly 213. Thus, the overall integrated combustion nozzle 100 may be relatively simple and quick to assemble compared to prior designs, at least due to the reduction of separate, individualized, components. In addition, since the unified head end 200 is a single component, the integrated combustor nozzle 100 may be scaled to much more compact sizes than in previous designs due to the ease of assembly. For example, rather than including multiple individualized components that require room for assembly relative to one another, the unified head end 100 is a singular component that may be include only a few assembly steps.

In addition, the support tube 218 advantageously provides for thermal protection barrier for the fuel supply conduits 222, thereby allowing for the use of solid hollow tubes (as opposed to bellows tubes), which reduces both part and assembly costs. Further, the support tube 218 may define one or more air inlets 280. For example, the one or more air inlets 280 may be defined on the support tube 218 within the compressor discharge casing 32 (at a location proximate the flange 238), such that compressed air flows into the support tube 218 at the one or more air inlets 280. The one or more air inlets 280 may be in fluid communication with the high pressure plenum 34. Compressed air may flow through the support tube 218 and exit at an outlet or outlet tube 282 (as shown in FIG. 10). The outlet tube 282 may extend from the support tube 218, through one of the first fuel nozzle 202 or the second fuel nozzle 204 to the combustion zone 101. In this way, purge air may flow from the air inlet 280, through the interior of the support tube 218, to the air outlet tube 282 and be ejected at the combustion zone 101, which may advantageously purge or sweep away any leaked fuel from the fuel supply conduits 222 into the combustion zone 101.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An integrated combustion nozzle, comprising:

a combustion liner extending along a radial direction between an inner liner segment and an outer liner segment, the combustion liner including a forward end portion axially separated from an aft end portion, a first side wall, and a second side wall, the aft end portion of the combustion liner defining a turbine nozzle, wherein the first side wall and the second side wall each defining a respective opening that extends both axially and radially;

a unified head end coupled to the combustion liner, the unified head end in fluid communication with a fuel supply, wherein the unified head end comprises:

a first fuel nozzle and a second fuel nozzle disposed at the forward end portion of the combustion liner, wherein a fuel plenum is defined between the first fuel nozzle and the second fuel nozzle;

a first liner portion that extends from the first fuel nozzle and into the respective opening of the first side wall such that the first liner portion forms a continuous surface with the first side wall of the combustion liner;

a second liner portion that extends from the second fuel nozzle and into the respective opening of the second side wall such that the second liner portion forms a continuous surface with the second side wall of the combustion liner.

2. The integrated combustion nozzle as in claim 1, further comprising a fuel injection assembly positioned downstream from the first fuel nozzle and the second fuel nozzle.

3. The integrated combustion nozzle as in claim 2, wherein the fuel injection assembly comprises a first set of fuel injectors extending through the first liner portion of the unified head end and a second set of fuel injectors extending through the second liner portion of the unified head end.

4. The integrated combustion nozzle as in claim 2, wherein the unified head end defines at least one fuel circuit in fluid communication with the fuel supply and the fuel injection assembly, the at least one fuel circuit extending from a fuel injector inlet through the fuel plenum to the fuel injection assembly.

5. The integrated combustion nozzle as in claim 1, wherein the unified head end defines a fuel nozzle inlet in fluid communication with the fuel supply and the fuel plenum.

6. The integrated combustion nozzle as in claim 1, further comprising a support tube that couples the integrated combustion nozzle to a compressor discharge casing.

7. The integrated combustion nozzle as in claim 6, wherein the support tube surrounds at least one fuel supply conduit, the fuel supply conduit fluidly coupled to one of a fuel nozzle inlet or a fuel injector inlet at a forward end of the unified head end.

8. The integrated combustion nozzle as in claim 7, wherein the support tube defines at least one air inlet in fluid communication with a high pressure plenum defined within the compressor discharge casing, wherein an air outlet tube extends from the support tube through one of the first fuel nozzle or the second fuel nozzle to a combustion zone, and wherein purge air flows through an interior of the support tube from the at least one air inlet to the air outlet tube.

9. The integrated combustion nozzle as in claim 1, further comprising a liquid fuel cartridge that extends through one of the first fuel nozzle or the second fuel nozzle.

10. The integrated combustion nozzle as in claim 9, wherein the liquid fuel cartridge is coupled to a compressor discharge casing via a mounting flange.

11. A turbomachine comprising:

a compressor section;

a compressor discharge casing disposed downstream from the compressor section;

a turbine section disposed downstream from the compressor discharge casing;

an annular combustion system disposed within the compressor discharge casing, the annular combustion system including a plurality of integrated combustion nozzles disposed in an annular array about an axial centerline of the turbomachine, wherein each integrated combustion nozzle comprises:

a combustion liner extending along a radial direction between an inner liner segment and an outer liner segment, the combustion liner including a forward end portion axially separated from an aft end portion, a first side wall, and a second side wall, the aft end portion of the combustion liner defining a turbine nozzle, wherein the first side wall and the second side wall each define a respective opening that extends both axially and radially;

a unified head end coupled to the combustion liner, the unified head end in fluid communication with a fuel supply, wherein the unified head end comprises:

a first fuel nozzle and a second fuel nozzle disposed at the forward end portion of the combustion liner, wherein a fuel plenum is defined between the first fuel nozzle and the second fuel nozzle;

a first liner portion that extends from the first fuel nozzle and into the respective opening of the first wall such that the first liner portion forms a continuous surface with the first wall of the combustion liner;

a second liner portion that extends from the second fuel nozzle and into the respective opening of the second wall such that the second liner portion forms a continuous surface with the second wall of the combustion liner.

12. The turbomachine as in claim 11, further comprising a fuel injection assembly positioned downstream from the first fuel nozzle and the second fuel nozzle.

13. The turbomachine as in claim 12, wherein the fuel injection assembly comprises a first set of fuel injectors extending through the first liner portion of the unified head end and a second set of fuel injectors extending through the second liner portion of the unified head end.

14. The turbomachine as in claim 12, wherein the unified head end defines at least one fuel circuit in fluid communication with the fuel supply and the fuel injection assembly, the at least one fuel circuit extending from a fuel injector inlet through the fuel plenum to the fuel injection assembly.

15. The turbomachine as in claim 11, wherein the unified head end defines a fuel nozzle inlet in fluid communication with the fuel supply and the fuel plenum.

16. The turbomachine as in claim 11, further comprising a support tube that couples the integrated combustion nozzle to the compressor discharge casing.

17. The turbomachine as in claim 16, wherein the support tube surrounds at least one fuel supply conduit, the fuel supply conduit fluidly coupled to one of a fuel nozzle inlet or a fuel injector inlet at a forward end of the unified head end.

18. The turbomachine as in claim 17, wherein the support tube defines at least one air inlet in fluid communication with a high pressure plenum defined within the compressor discharge casing, wherein an air outlet tube extends from the support tube through one of the first fuel nozzle or the second fuel nozzle to a combustion zone, and wherein purge air flows through an interior of the support tube from the at least one air inlet to the air outlet tube.

19. The turbomachine as in claim 11, further comprising a liquid fuel cartridge that extends through one of the first fuel nozzle or the second fuel nozzle.

20. The turbomachine as in claim 19, wherein the liquid fuel cartridge is coupled to a compressor discharge casing via a mounting flange.

* * * * *